United States Patent
Hornick et al.

(10) Patent No.: US 6,865,573 B1
(45) Date of Patent: Mar. 8, 2005

(54) DATA MINING APPLICATION PROGRAMMING INTERFACE

(75) Inventors: Mark Hornick, Waltham, MA (US); Dzhangir Dadashev, Sudbury, MA (US)

(73) Assignee: Oracle International Corporation, Redwood Shores, CA (US)

(*) Notice: Subject to any disclaimer, the term of this patent is extended or adjusted under 35 U.S.C. 154(b) by 586 days.

(21) Appl. No.: 09/915,286

(22) Filed: Jul. 27, 2001

(51) Int. Cl.[7] ............................................. G06F 17/30
(52) U.S. Cl. ................................. 707/6; 707/10; 707/3
(58) Field of Search ............................. 707/3, 10, 101, 707/6, 4; 719/170

(56) References Cited

U.S. PATENT DOCUMENTS

| | | | | |
|---|---|---|---|---|
| 5,884,320 A | * | 3/1999 | Agrawal et al. .......... | 707/104.1 |
| 6,167,395 A | * | 12/2000 | Beck et al. ..................... | 707/3 |
| 6,438,544 B1 | * | 8/2002 | Grimmer et al. .............. | 707/5 |
| 6,523,022 B1 | * | 2/2003 | Hobbs .......................... | 707/3 |
| 6,704,747 B1 | * | 3/2004 | Fong ........................... | 707/100 |
| 6,757,689 B2 | * | 6/2004 | Battas et al. ................. | 707/101 |
| 6,795,895 B2 | * | 9/2004 | Merkey et al. ............. | 711/114 |
| 2002/0083067 A1 | * | 6/2002 | Tamayo et al. ............. | 707/100 |

OTHER PUBLICATIONS

Ranjit et al. (Application of intelligent technology for managerial data analysis and mining), ACM SIGMIS database, ACM Pres New York, USA, vol. 30, Issue 1, Winter 1999.*

Do Narscimento Fidalgo et al. (Providing OLAP interoperability with OLAPWare), Computer Science Society, 2002, SCCC 2002. Pro 22nd International Conference of the Chilean, Nov. 6–8, 2002, pp. 167–176.*

\* cited by examiner

Primary Examiner—Jean M. Corrielus
Assistant Examiner—Baouqoc N. To
(74) Attorney, Agent, or Firm—Swidler Berlin LLP (57) ABSTRACT

An application programming interface, computer program product implementing the application programming interface, and a system implementing the application programming interface, which provides an advanced interface including support for hierarchical and object-oriented programming languages and sophisticated programming language constructs, and does not need to be integrated using additional tools. The application programming interface for providing data mining functionality comprises a first layer providing an interface with an application program, and a second layer implementing data mining functionality, the second layer comprising a mining object repository maintaining data mining metadata, a plurality of mining project objects each mining project object containing data mining objects created and used by a user, a plurality of mining session objects, each mining session object containing data mining processing performed on behalf of a user, a plurality of data mining tables, each data mining table mapping a table or a view in a database, a plurality of data transformation objects, each data transformation object defining computations or manipulations to be performed on data in the database, a plurality of data mining models, each data mining model implementing conditions and decisions, and a plurality of data mining result objects, each data mining result object generated as a result of scoring or analyzing a data mining model or an input dataset.

49 Claims, 7 Drawing Sheets

DATA MINING APPLICATION
PROGRAMMING INTERFACE

FIELD OF THE INVENTION

The present invention relates to an application programming interface for implementing data mining functionality.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior or recommendations for actions, such as purchases, based on past actions.

In order to add data mining functionality to application software, the application software must access and control software that provides the data mining functionality. Typically, application software accesses and controls the data mining software using an application programming interface (API) that is specific to the particular data mining software being used. Existing data mining software products provide APIs that are based on proprietary scripting languages, which are specific to each data mining software product. A problem arises with such existing languages in that they are inherently flat in structure, or use a non-object oriented programming language to specify the interface. Since most modern application software is written in standard object-oriented programming languages, using flat and/or non-object oriented APIs can be difficult and clumsy.

Additional problems arise in that existing data mining software products are often limited in the degree of programming language constructs that they support. For example, many data mining software products provide limited or no support for loops and conditional logic and parameterization of functions composed of data mining commands. In addition, many data mining tool scripting languages need to be integrated using an additional scripting tool, such as Practical Extraction and Report Language (Perl).

A need arises for a data mining application programming interface that provides an advanced interface including support for hierarchical and object-oriented programming languages and sophisticated programming language constructs, and does not need to be integrated using additional tools.

SUMMARY OF THE INVENTION

The present invention is an application programming interface, computer program product implementing the application programming interface, and a system implementing the application programming interface, which provides an advanced interface including support for hierarchical and object-oriented programming languages and sophisticated programming language constructs, and does not need to be integrated using additional tools. The application programming interface for providing data mining functionality, according to the present invention, comprises: a first layer providing an interface with an application program, and a second layer implementing data mining functionality, the second layer comprising a mining object repository maintaining data mining metadata, a plurality of mining project objects, each mining project object containing data mining objects created and used by a user, a plurality of mining session objects, each mining session object containing data mining processing performed on behalf of a user, a plurality of data mining tables, each data mining table mapping a table or a view in a database, a plurality of data transformation objects, each data transformation object defining computations or manipulations to be performed on data in the database, a plurality of data mining models, each data mining model including rules implementing conditions and decisions, and a plurality of data mining result objects, each data mining result object generated as a result of scoring or analyzing a data mining model or an input dataset.

The application programming interface may further comprise a plurality of data mining settings objects, each data mining settings object specifying a type of model to build and function and model building algorithm specific parameters.

The first layer may be a client-side layer operable to execute on a client computer system. The second layer may be a server-side layer operable to execute on a server computer system. The first layer and the second layer may be implemented in the Java programming language. The database may comprise training data to be used to train the data mining models. The database may comprise test and evaluation data to be used to test and evaluate the data mining models. The database may comprise scoring data to be used to score the data mining models. Each data mining project object may maintain a name space within which data mining objects are named. A data mining project object may be shared among users. The data mining table objects may be included in the data mining object repository. Each data mining table may include a set of columns of data mining data and associated metadata. Each data mining transformation object may perform data transformations on a data mining table, a data column in a data mining table, a data row in a data mining table, or a value in a data row or a data column in a data mining table. 1. Each data mining transformation object may comprise metadata. Each data mining settings object may comprise metadata. Each data mining model may comprise metadata.

The application programming interface may further comprise a plurality of schema view objects, each schema view object providing access to a data table in the data mining object repository. The application programming interface may further comprise a plurality of data mining settings objects, each data mining settings object specifying parameters for building a particular type of data mining model.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
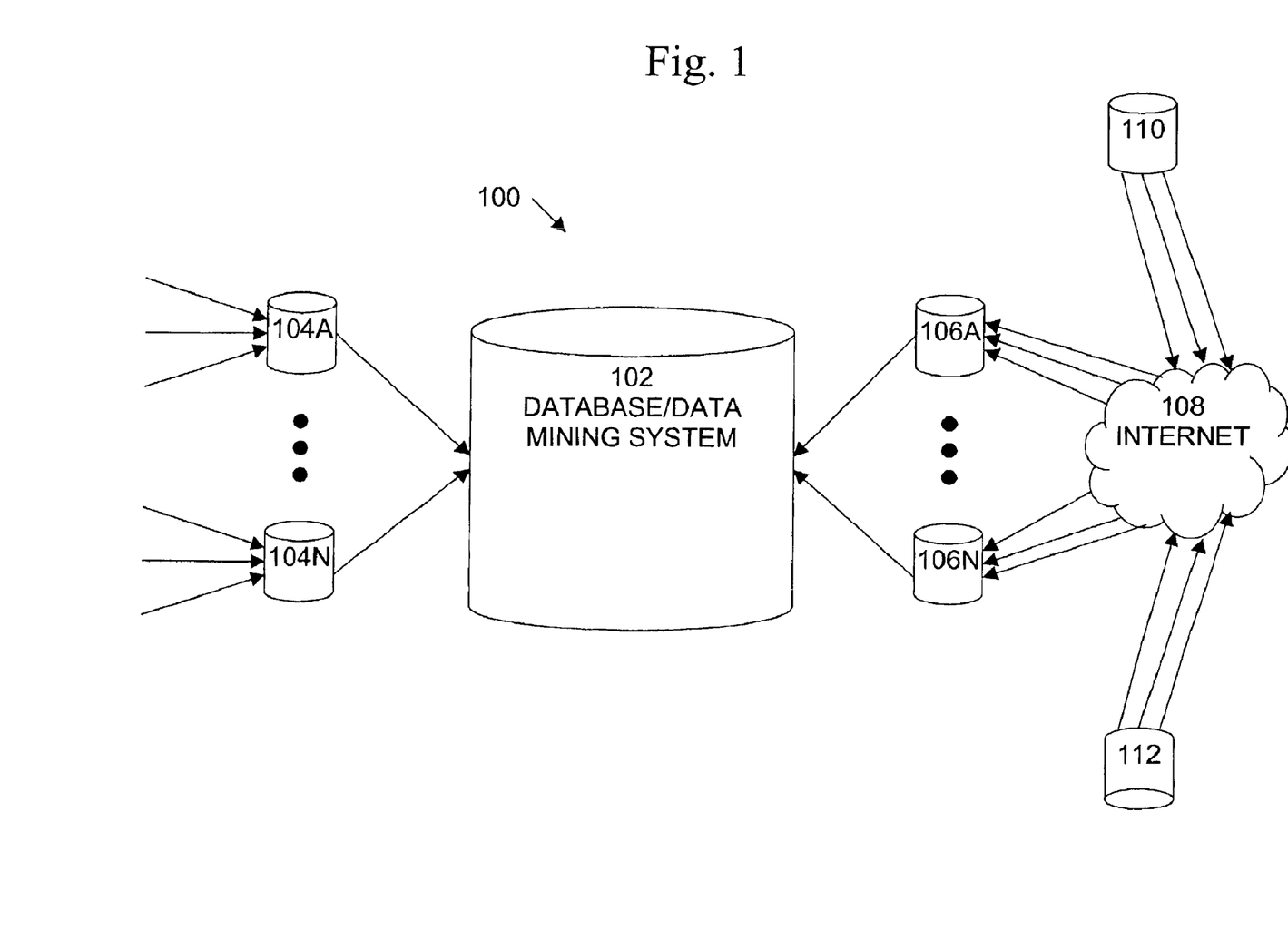
FIG. 1 is an exemplary block diagram of a data mining system, in which the present invention may be implemented.

An exemplary data mining system 100, in which the present invention may be implemented, is shown in FIG. 1. System 100 includes a database/data mining system 102 that is connected to a variety of sources of data. For example, system 102 may be connected to a plurality of internal or proprietary data sources, such as systems 104A–104N. Systems 104A–104N may be any type of data source, warehouse, or repository, including those that are not publicly accessible. Examples of such systems include inventory control systems, accounting systems, scheduling systems, etc. System 102 may also be connected to a plurality of proprietary data sources that are accessible in some way over the Internet 108. Such systems include systems 106A–106N, shown in FIG. 1. Systems 106A–106N may be publicly accessible over the Internet 108, they may be privately accessible using a secure connection technology, or they may be both publicly and privately accessible. System 102 may also be connected to other systems over the Internet 108. For example, system 110 may be privately accessible to system 102 over the Internet 108 using a secure connection, while system 112 may be publicly accessible over the Internet 108.

The common thread to the systems connected to system 102 is that the connected systems all are potential sources of data for system 102. The data involved may be of any type, from any original source, and in any format. System 102 has the capability to utilize all such data that is available to it.

Figure 2:
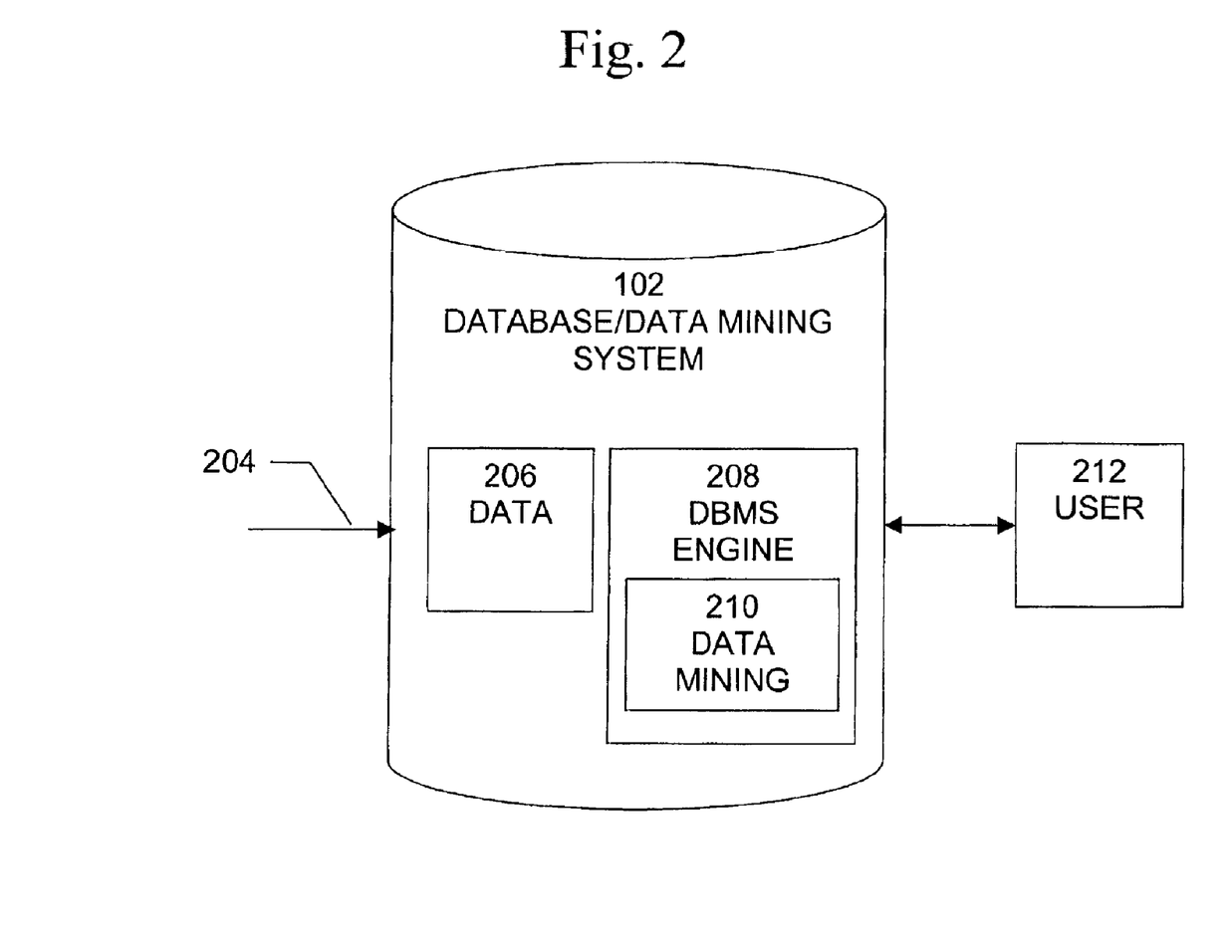
FIG. 2 is an exemplary block diagram of a database/data mining system shown in FIG. 1.

An exemplary embodiment of database/data mining system 102 is shown in FIG. 2. System 102 is a database management system that includes data mining functionality. Database/data mining system 102 is connected to data sources 204, such as the proprietary and public data sources shown in FIG. 1. Database/data mining system 102 includes two main components, data 206, and database management system (DBMS) engine 208. Data 206 includes data, typically arranged as a plurality of data tables, such as relational data tables, as well as indexes and other structures that facilitate access to the data. DBMS engine 208 typically includes software that receives and processes queries of the database, obtains data satisfying the queries, and generates and transmits responses to the queries. DBMS engine 208 also includes data mining block 210, which provides DBMS engine 208 with the capability to obtain data and perform data mining processing on that data, so as to respond to requests for data mining processed data from one or more users, such as user 212.

Figure 3:
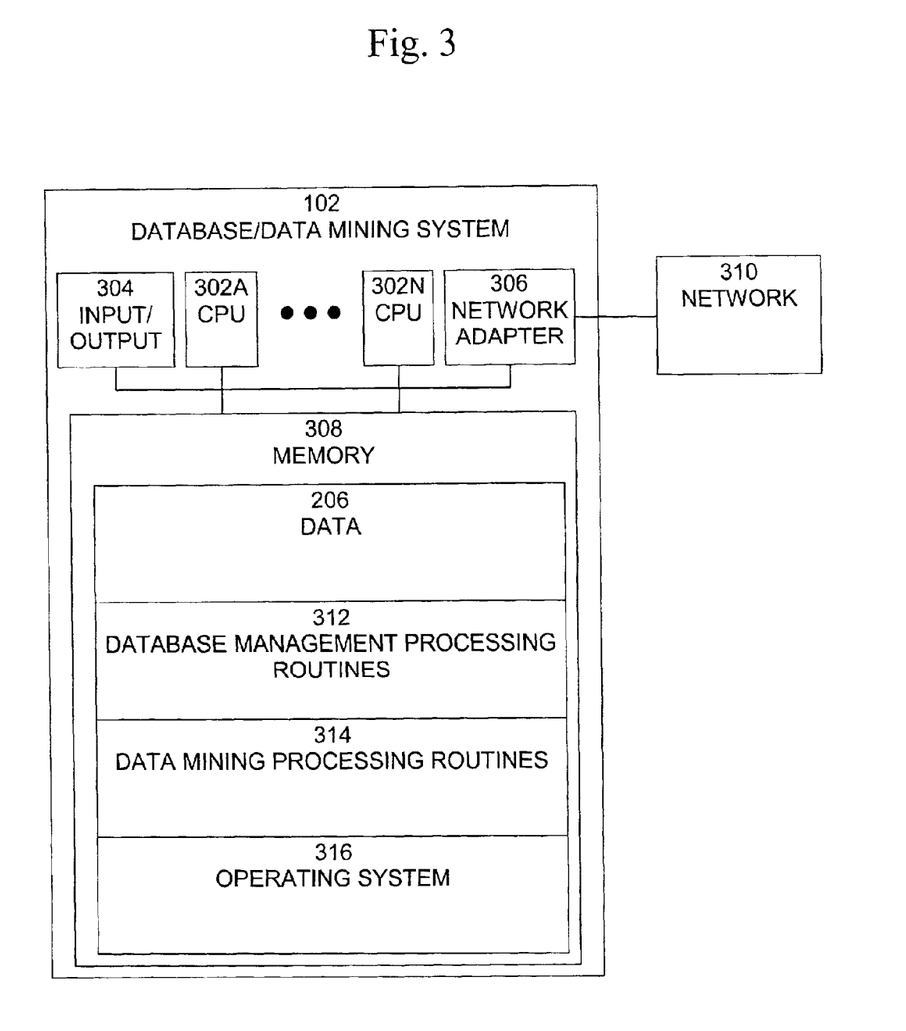
FIG. 3 is an exemplary block diagram of a database/data mining system 102 shown in FIG. 1.

An exemplary block diagram of a database/data mining system 102, shown in FIG. 1, is shown in FIG. 3. Database/data mining system 102 is typically a programmed general-purpose computer system, such as a personal computer, workstation, server system, and minicomputer or mainframe computer. Database/data mining system 102 includes one or more processors (CPUs) 302A–302N, input/output circuitry 304, network adapter 306, and memory 308. CPUs 302A–302N executes program instructions in order to carry out the functions of the present invention. Typically, CPUs 302A–302N are one or more microprocessors, such as an INTEL PENTIUM® processor. FIG. 3 illustrates an embodiment in which data mining system 102 is implemented as a single multi-processor computer system, in which multiple processors 302A–302N share system resources, such as memory 308, input/output circuitry 304, and network adapter 306. However, the present invention also contemplates embodiments in which data mining system 102 is implemented as a plurality of networked computer systems, which may be single-processor computer systems, multi-processor computer systems, or a mix thereof.

Input/output circuitry 304 provides the capability to input data to, or output data from, database/data mining system 102. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces database/data mining system 102 with network 310. Network 310 may be any standard local area network (LAN) or wide area network (WAN), such as Ethernet, Token Ring, the Internet, or a private or proprietary LAN/WAN.

Memory 308 stores program instructions that are executed by, and data that are used and processed by, CPU 302 to perform the functions of the database/data mining system 102. Memory 308 may include electronic memory devices, such as random-access memory (DAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes data 206, database management processing routines 312, data mining processing routines 314, and operating system 316. Data 206 includes data, typically arranged as a plurality of data tables, such as relational database tables, as well as indexes and other structures that facilitate access to the data. Database management processing routines 312 are software routines that provide database management functionality, such as database query processing. Data mining processing routines 314 are software routines that implement the data mining processing performed by the present invention. Preferably, this data mining processing is integrated with database management processing. For example, data mining processing may be initiated by receipt of a database query, either in standard SQL or in the form of extended SQL statements. Operating system 316 provides overall system functionality.

Figure 4:
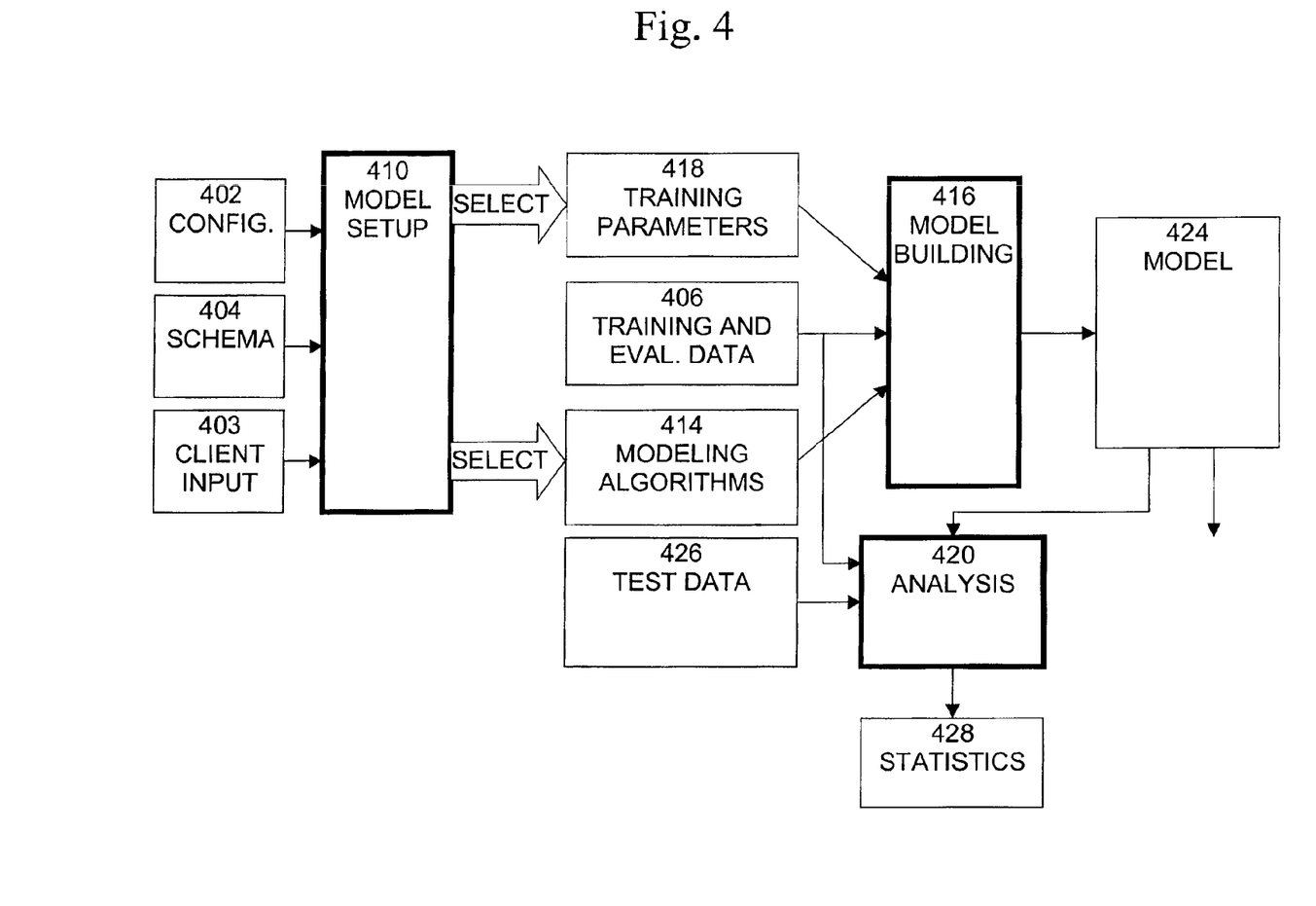
FIG. 4 is an exemplary data flow diagram of a data mining model building process performed by the data mining engine shown in FIG. 3.

A data flow diagram of a model building process, which may be performed by a data mining engine, is shown in FIG. 4. Model building involves building the models, for example, neural network models, decision tree models, association rule models, etc., which can be used to perform online recommendation and prediction. A configuration 402 defines the default system settings that affect data mining system operation and algorithm model building behavior, such as maximum allowed parallelism for a given model build, etc. A schema 404 defines the data used in the data mining process by providing metadata on the attributes used by the data mining algorithms. Client input 403 includes information that allows the user to control the building of data mining models, such as neural networks, decision trees, association rules, etc. For example, client input 403 may include information specifying a number of artificial neurons to be used in a data mining model, a type of neural network model to be build, such as a self-organizing map, a k-means model, a competitive learning model, etc., and other parameters that are specific to the type of model selected. Client input 403 takes the role of settings that prescribe model selection and data mining algorithm behavior. The configuration 402, the schema 404, and the client input 403 are input to model setup step 410, which sets up the models for training. In particular, model setup step 410 selects the modeling algorithms 414 that process the training data in order to actually build the models. For example, modeling algorithms 414 may include a self-organizing map (SOM) algorithm, a competitive learning model algorithm, a neural network modeling algorithm, etc. The algorithms that are to be used to build models can be automatically selected by model setup step 410 based on the definitions in schema 404, and as specified by the client input 403.

In addition, model setup step 410 generates and sets training parameters 418, where the user has indicated no preferences. Training parameters 418 are parameters that are input to the algorithms to control how the algorithms build the models. Training data 406 is data that is input to the algorithms that is used to actually build the models. Training parameters 418, the selected modeling algorithm, and training data 406 are input to model building block 416.

Model building block 416 invokes the selected modeling algorithm, initializes it using the training parameters 418, processes training data 406 using the modeling algorithm, and generates model 424. Model 424 includes a set of rules and/or data that implement the conditions and decisions that make up an operational model.

Analysis block 420 performs two separate functions. First, analysis block 420 statistically analyzes model 424 and tests the model using a held aside dataset, such as test data 426, in the case of a supervised learning model. Analysis block 420 also generates statistics 428, which are computed from training data 406. Statistics 428 are used in the model scoring process shown in FIG. 5 to determine if scoring data presented to the model for scoring conforms to the same distribution and characteristics as the training data that was used to build the model.

Figure 5:
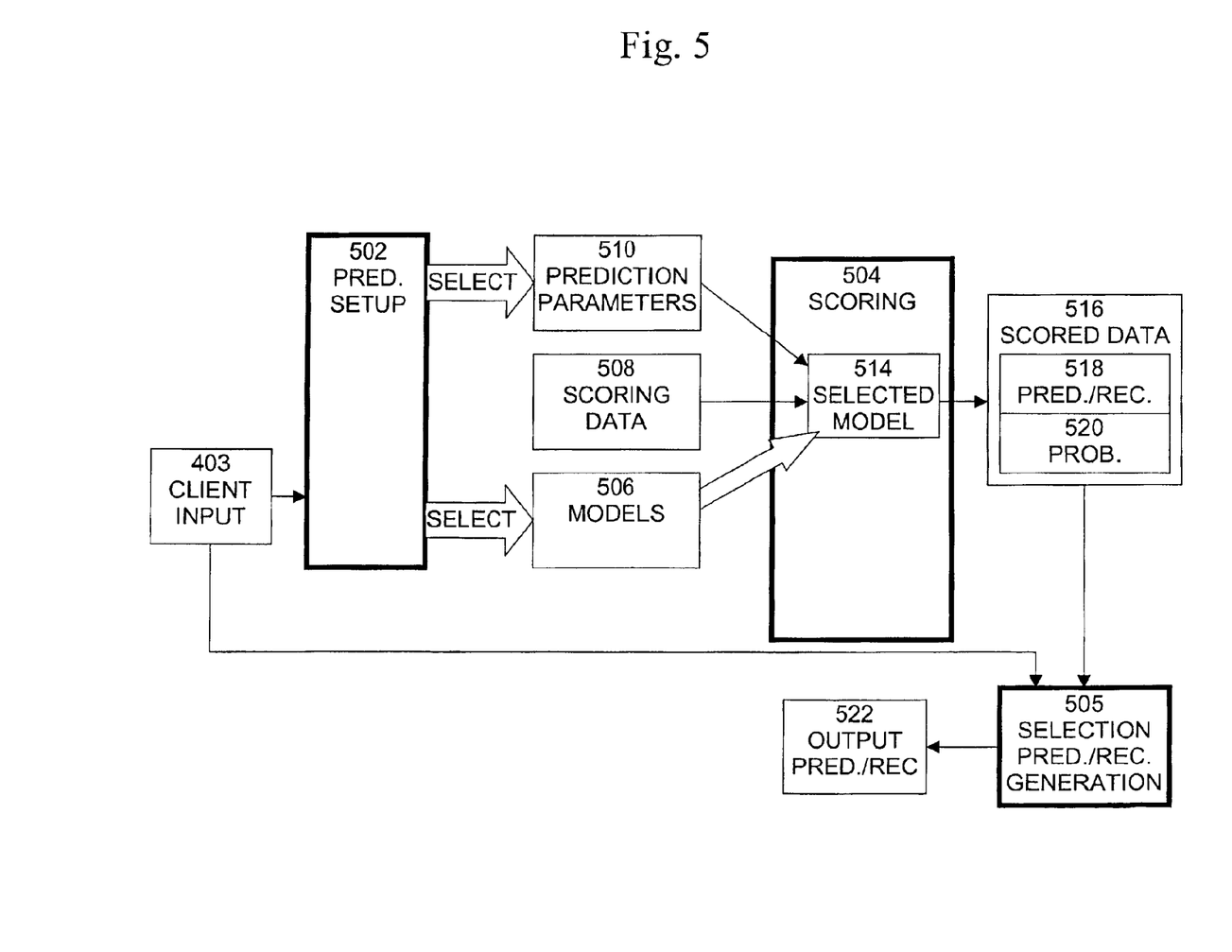
FIG. 5 is an exemplary data flow diagram of a data mining model scoring process performed by the data mining engine shown in FIG. 3.

A data flow diagram of a model scoring process is shown in FIG. 5. Client input 403 is input to prediction setup step 502. Client input 403 includes user data and desired results data. User data may include data relating to the type of predictions/recommendations desired by the user, data relating to constraints on the generated prediction/recommendation desired by the user, or relating to specific actions the user is currently taking that define the context in which the data mining is occurring. For example, in the case of a retail Website, browsing actions of a user may define the context in which the data mining is occurring. Desired results data may include definitions of the types of predictions and recommendations and constraints on the predictions and recommendations desired by the operator of the data mining system. For example, user data may include information relating to items the user is purchasing and desired results data may indicate that the desired result is a recommendation for another product to be suggested to the user for purchase.

Prediction setup step 502 uses the input user data and desired results data to select trained models 506 and to select and/or generate prediction parameters 510 based on client input 403. Models 506 include one or more trained models that were generated by model building block 416, shown in FIG. 4. Prediction setup step 502 selects a model for use in scoring step 504 based on the user data and on the desired results data included in client input 403. Prediction parameters 510 are parameters that are input to the scoring step 504 to control the scoring of scoring data 508 against the model.

The selected model 514, prediction parameters 510, and scoring data 508 are input to scoring step 504. In scoring step 504, scoring data 408 is processed according to selected model 514, as controlled by prediction parameters 510, to generate one or more scores using model 514. For example, in a rule based model, such as a decision tree model, a rule is defined in terms of a function of input variables and a corresponding prediction/recommendation. The input scoring data 508 is input to the function of each rule. The function is evaluated using the input scoring data 508 and scores are generated. The scores for each rule indicate how closely the function defined by the rule matches the prediction data, how much confidence may be placed in the match, how likely the output prediction/recommendation from the rule is likely to be true, and other statistical indicators. The generated scored data 516 is output from scoring step 504 and includes the predictions/recommendations 518 for each scored rule, along with the corresponding probabilities 520 for each scored rule.

The scored data 516 is input to selection and prediction/recommendation generation step 505, which evaluates the predictions 518 and probabilities 520 and selects at least a portion of the predictions/recommendations 522. The selected predictions/recommendations 522 are those having scores meeting the selection criteria. The selection criteria may be defined by prediction parameters 510 and/or by predefined or default criteria included in selection/generation step 505. In addition, the selection criteria may include a limit on the number of predictions/recommendations that are to be selected, or may indicate that the predictions/recommendations are to be sorted based on their associated scores. The selected predictions/recommendations are output 522 from step 505 for post data mining processing and/or output to the user.

Figure 6:
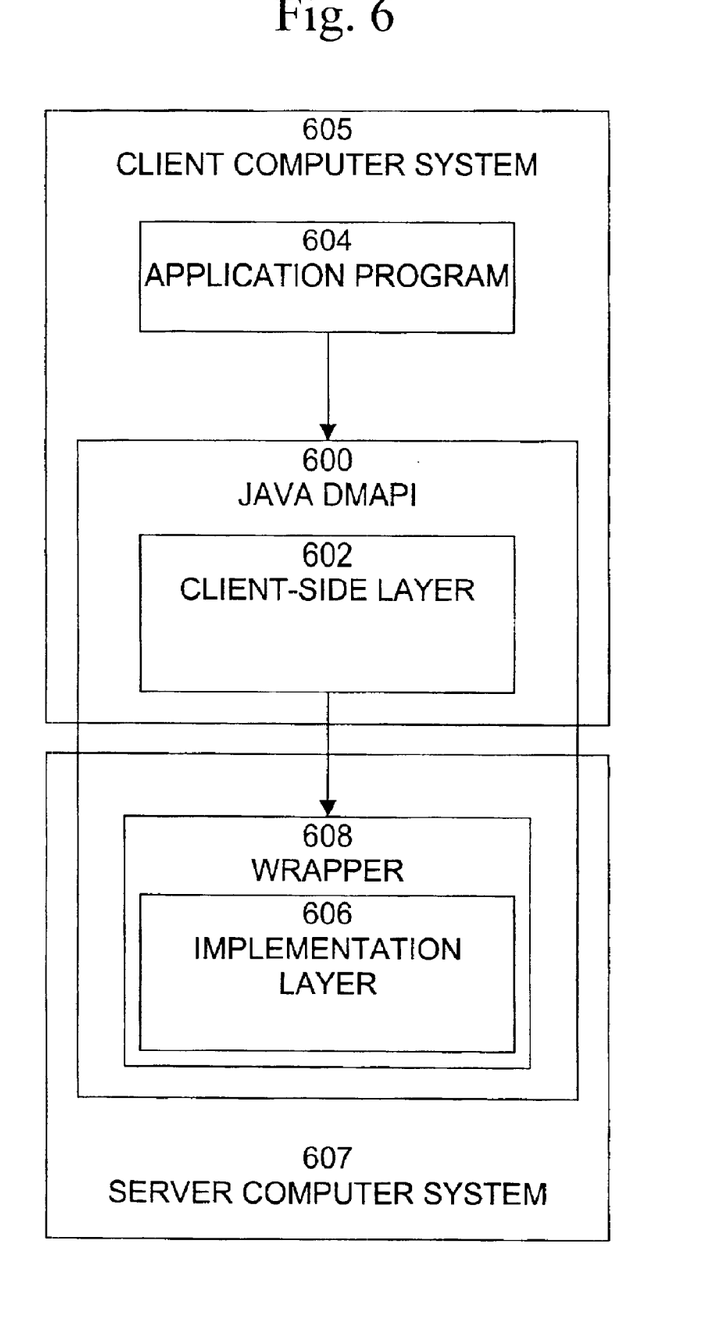
FIG. 6 is an exemplary block diagram of a Data Mining Application Programming Interface, according to the present invention.

An exemplary block diagram of a Data Mining Application Programming Interface (DMAPI), according to the present invention, is shown in FIG. 6. DMAPI 600 defines a set of classes and operations to create and manipulate data mining objects. Specifically, DMAPI 600 provides support for the following functional areas:

User authentication (login, logout) and session interactions;

Project and mining object name manipulation;

Creation and retrieval of mining metadata;

Enqueuing of data mining operations performed by the server process;

Retrieval of notifications and queued operation final response;

Definition of database views over the MOR tables to enable direct client read-only access; and Creation of transformations over datasets used in the data mining process.

DMAPI 600 is preferably implemented as a two tiered architecture consisting of a thin client-side API layer 602, which provides a direct interface with application program 604. Layer 602, being a client-side layer, is executed in a client computer system 605. DMAPI 600, also includes a thick server-side implementation layer 606, which is executed in a server computer system 607. DMAPI 600 is preferably implemented using the JAVA® (Java) programming language for client-side layer 602. Implementation layer 606 may be implemented in any programming language that can provide suitable performance.

Java is a high-level programming language developed by SUN MICROSYSTEMS®. Java is an object-oriented language similar to C++, but simplified to eliminate language features that cause common programming errors. Java source code files (files with a java extension) are compiled into a format called bytecode (files with a class extension), which can then be executed by a Java interpreter. Compiled Java code can run on most computers because Java interpreters and runtime environments, known as Java Viral Machines (VMs), exist for most operating system, including UNIX®, the APPLE MACINTOSH OS®, and MICROSOFT WINDOWS®. Bytecode can also be converted directly into machine language instructions by a just-in-time compiler (JIT). Java is a general purpose programming language with a number of features that make the language well suited for use on the World Wide Web. Small Java applications are called Java applets and can be downloaded from a Web server and run on your computer by a Java-compatible Web browser, such as NETSCAPE NAVIGATOR® or MICROSOFT INTERNET EXPLORER®.

Scripting of data mining operation sequences may be accomplished through a combination of the DMAPI calls and standard Java code. This allows DMAPI 600 to provide a fully supported and flexible interface for providing data mining functionality to application programs. Implementation layer may be provided as a Java core implementation with a PL/SQL wrapper 608, which is automatically generated, making it accessible to the Java DMAPI client-side API layer 602 via Java Database Connectivity (JDBC). JDBC is a Java API that enables Java programs to execute SQL statements. This allows Java programs to interact with any SQL-compliant database. Since nearly all relational database management systems (DBMSs) support SQL, and because Java itself runs on most platforms, JDBC makes it possible to write a single database application that can run on different platforms and interact with different DBMSs.

DMAPI 600 provides a Java-based API that enables scripting within Java programs. Java has quickly become the programming language of choice for many advanced applications, including web-based applications and servers. This makes the API more accessible and usable by a broader range of customers. This also avoids having to develop a proprietary scripting syntax with associated programming control constructs.

Figure 7:
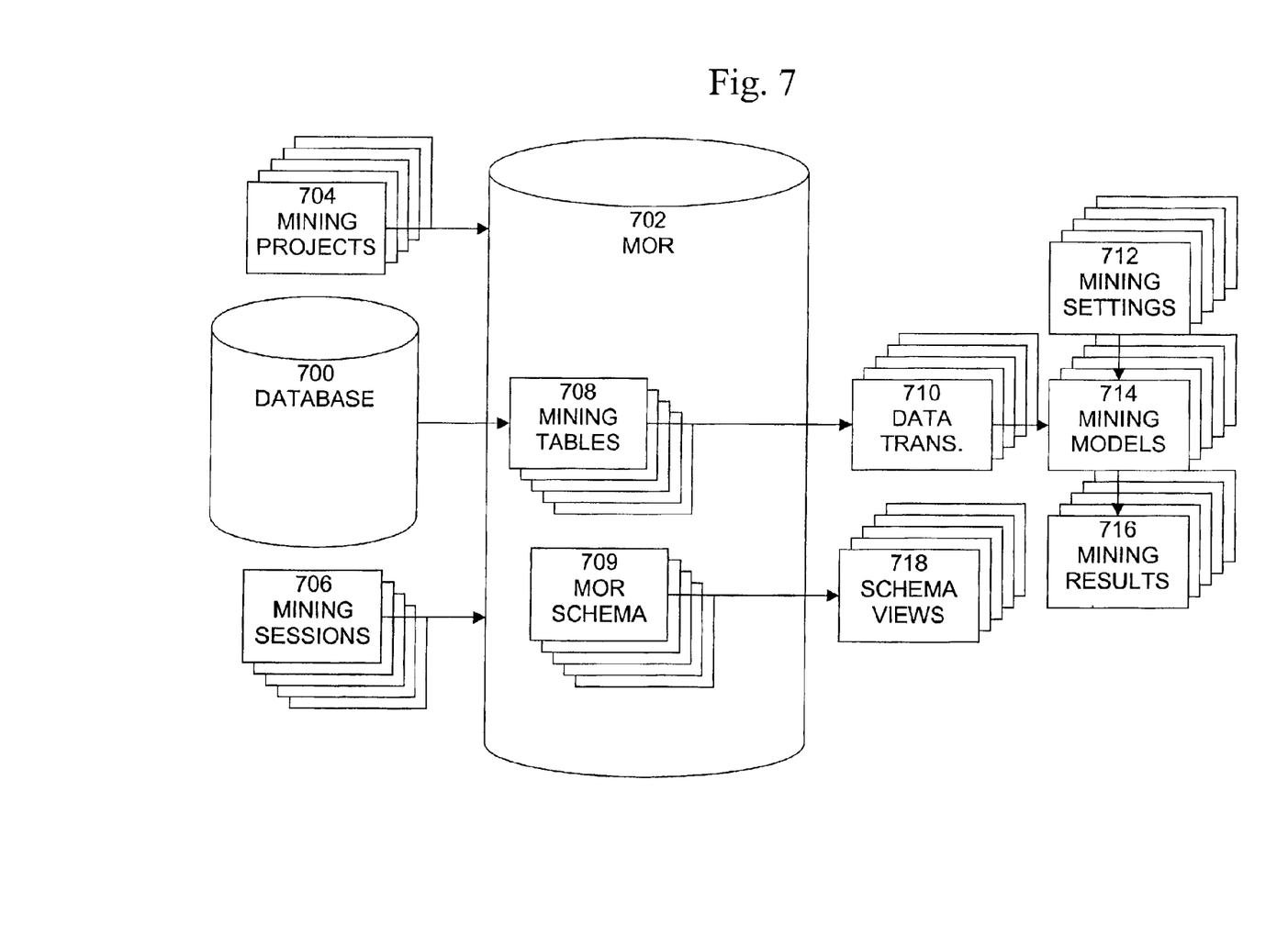
FIG. 7 is an exemplary block diagram of major objects handled by the Data Mining Application Programming Interface shown in FIG. 6.

An exemplary block diagram of major objects handled by DMAPI 600 is shown in FIG. 7. Database 700 represents one or more database systems that store training data that is used for training data mining models during the model building process and scoring data mining models during the prediction/recommendation generation process. Mining Object Repository (MOR) 702 is a database that maintains Mining Metadata defined by the data mining schema and serves as the focus for logging into the data mining system, logging off, and validating users to use MOR and data mining functionality. Mining Projects 704 serve as containers for the data mining objects used and created by a user. Each user has one or more projects, and each project maintains a separate name space within which to name mining objects. Users may choose to mark a project as shared such that all other users of the system have read-only and copy privileges. Multiple users can log in using the same user ID if they wish to work in the same project since a project is owned by a single user ID. Mining Sessions 706 serve as containers for the data mining processing performed on behalf of a user during each login session.

Mining Tables 708 are data mining system maintained entities that map to a table or a view in database 700. Each table 708 includes a set of columns of data mining data and associated metadata. Mining Table instances exist within the MOR 702. Data Transformations 710 include computations or manipulations performed on a data mining table, a data column in a data mining table, a data row in a data mining table, or a value in a data row or a data column in a data mining table to support data exploration or preparation leading to providing a table's data for data mining. Transformations utilize Mining Table and Column metadata, including statistics, as maintained in MOR 702, to effect the transformation. Mining Settings 712 specify the parameters for building a particular type of data mining model. Settings will include both general and algorithm-specific data. Instances can be reused to build multiple models on different datasets. Mining Models 714 represent the result of mining algorithm build operations. Each mining model includes a set of rules that implement the conditions and decisions that make up the model. These conditions and decisions are typically represented as metadata and extensible markup language (XML) strings. Each XML string contains specific model statistics and results that may be of interest to end users. Mining Results 716 include prediction/recommendation information produced as a result of the model scoring process, which yields several kinds of result objects: lift, evaluation (e.g., confusion matrix), apply, etc. Instances of Mining Results 716 and subclasses maintain the model that created the result and the mining input data. Schema Views 718 are part of DMAPI 600 that exposes certain tables in MOR schema 709 as views to allow unrestricted read-only access for end users. These views may be one-to-one mappings to the source MOR table, or derivatives of one or more MOR tables as deemed appropriate. This avoids having DMAPI 600 become too verbose to anticipate developer needs and provides flexible querying by users.

DMAPI 600 supports remote invocation of data mining functionality and supporting Java and PL/SQL packages, as well as database-internal usage. DMAPI 600 provides progress feedback to users for long running operations. As such DMAPI functionality can be categorized as direct, synchronous manipulation of MOR tables involving fast operations, longer running operations requiring status reporting, asynchronous operations, workflow-supported database operations, and enqueuing requests for the data mining processing.

Some DMAPI operations take less than one second to execute. These may or may not access the MOR database. Such operations occur synchronously and provide no feedback to the user on progress, indicative of their fast execution. Other DMAPI operations that are also synchronous may take considerably longer to execute, on the order of minutes or hours, e.g., the execution of a sophisticated query over a very large mining table. These operations accept a status request and return status information. Asynchronous operations can be supported by workflow processing or may enqueue their requests for processing. Once the DMAPI turns over control to an asynchronous handler, it is up to the handler to provide status notifications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RMA, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An application program interface executable by a computer for providing data mining functionality comprising:
    A first layer providing an interface with an application program; and
    A second layer implement data mining functionality, the second layer comprising:
        A data mining object repository maintaining data mining metadata,
        A plurality of data mining project objects, each data mining session object containing data mining objects created and used by a user,
        A plurality of data mining session objects, each data mining session object contain data mining processing performed on behalf of a user,
        A plurality of data mining tables, each data mining table mapping a table or a view in a database,
        A plurality of data transformation objects, each data transformation object defining computations to be performed on data in the database, a plurality of data mining models, each data mining model implementing conditions and decisions, and
        A plurality of data mining results objects, each data mining results object generated as a result of scoring or analyzing a data mining model or an input data set;
    Wherein the first layer and the second layer are implemented in the Java program language.

2. The application programming interface of claim 1, further comprising a plurality of data mining settings objects, each data mining settings object specifying a type of model to build and function and model building algorithm specific parameters.

3. The application programming interface of claim 2, wherein the first layer is a client-side layer operable to execute on a client computer system.

4. The application programming interface of claim 3, wherein the second layer is server-side layer operable to execute on a server computer system.

5. The application programming interface of claim 4, wherein the database comprises training data to be used to train the data mining models.

6. The application programming interface of claim 5, wherein the database comprises test and evaluation data to be used to test and evaluate the data mining models.

7. The application programming interface of claim 6, wherein the database comprises scoring data to be used to score the data mining models.

8. The application programming interface of claim 7, wherein each data mining project object maintains a name space within which data mining objects are named.

9. The application programming interface of claim 8, wherein a data mining project object may be shared among users.

10. The application programming interface of claim 9, wherein the data mining table objects are included in the data mining object repository.

11. The application programming interface of claim 10, wherein each data mining table includes a set of columns of data mining data and associated metadata.

12. The application programming interface of claim 11, wherein each data mining transformation object performs data transformations on a data mining table, a data column in a data mining table, a data row in a data mining table, or a value in a data row or a data column in a data mining table.

13. The application programming interface of claim 12, wherein each data mining transformation object comprises metadata.

14. The application programming interface of claim 13, wherein each data mining settings object comprises metadata.

15. The application programming interface of claim 14, wherein each data mining model comprises metadata.

16. The application programming interface of claim 15, further comprising a plurality of schema view objects, each schema view object providing access to a data table in the data mining object repository.

17. A computer program product for use in an electronic data processing system, comprising:
    A computer readable medium;
    Computer program instructions, recorded on the computer readable medium, executable by a processor, for implementing an application program interface for providing data mining functionality comprising:
        A first layer providing an interface with an application program; and
        A second layer implemented data mining functionality, the second layer comprising:
            A data mining object repository maintaining data mining metadata,
            A plurality of data mining project objects, each data mining session object containing data mining objects created and used by a user,
            A plurality of data mining session objects, each data mining session object contain data mining processing performed on behalf of a user,
            A plurality of data mining tables, each data mining table mapping a table or a view in a database,
            A plurality of data transformation objects, each data transformation object defining computations to be performed on data in the database, a plurality of data mining models, each data mining models implementing conditions and decisions, and
            A plurality of data mining results objects, each data mining results object generated as a result of scoring or analyzing a data mining model or an input data set;
    Wherein the first layer and the second layer are implemented in the Java program language.

18. The application programming interface of claim 17, further comprising a plurality of data mining settings objects, each data mining settings object specifying a type of model to build and function and model building algorithm specific parameters.

19. The computer program product of claim 18, wherein the first layer is a client-side layer operable to execute on a client computer system.

20. The computer program product of claim 19, wherein the second layer is a server-side layer operable to execute on a server computer system.

21. The computer program product of claim 20, wherein the database comprises training data to be used to train the data mining models.

22. The application programming interface of claim 21 wherein the database comprises test and evaluation data to be used to test and evaluate the data mining models.

23. The computer program product of claim 22, wherein the database comprises scoring data to be used to score the data mining models.

24. The computer program product of claim 23, wherein each data mining project object maintains a name space within which data mining objects are named.

25. The computer program product of claim 24, wherein a data mining project object may be shared among users.

26. The computer program product of claim 25, wherein the data mining table objects are included in the data mining object repository.

27. The computer program product of claim 26, wherein each data mining table includes a set of columns of data mining data and associated metadata.

28. The computer program product of claim 27, wherein each data mining transformation object performs data transformations on a data mining table, a data column in a data mining table, a data row in a data mining table, or a value in a data row or a data column in a data mining table.

29. The computer program product of claim 28, wherein each data mining transformation object comprises metadata.

30. The computer program product of claim 29, wherein each data mining settings object comprises metadata.

31. The computer program product of claim 30, wherein each data mining model comprises metadata.

32. The computer program product of claim 31, further comprising a plurality of schema view objects, each schema view object providing access to a data table in the data mining object repository.

33. The computer program product of claim 32, further comprising a plurality of data mining settings objects, each data mining settings object specifying parameters for building a particular type of data mining model.

34. A system for implementing an application program interface for providing data mining functionality comprising:

A processor operable to execute computer program instructions; and

A memory operable to store computer program instruction executable by the processor, the computer program instructions implementing an application program interface for providing a data mining functionality comprising:

A first layer providing an interface with an application program; and

A second layer implement data mining functionality, the second layer comprising:

A data mining object repository maintaining data mining metadata,

A plurality of data mining project objects, each data mining session object containing data mining objects created and used by a user, A plurality of data mining session objects, each data mining session object contain data mining processing performed on behalf of a user, A plurality of data mining tables, each data mining table mapping a table or a view in a database, A plurality of data transformation objects, each data transformation object defining computations to be performed on data in the database, a plurality of data mining models, each data mining model implementing conditions and decisions, and A plurality of data mining results objects, each data mining results object generated as a result of scoring or analyzing a data mining model or an input data set;

Wherein the first layer and the second layer are implemented in the Java program language.

35. The system of claim 34, further comprising a plurality of data mining settings objects, each data mining settings object specifying a type of model to build and function and model building algorithm specific parameters.

36. The system of claim 35, wherein the first layer is a client-side layer operable to execute on a client computer system.

37. The system of claim 36, wherein the second layer is server-side layer operable to execute on a server computer system.

38. The system of claim 37, wherein the database comprises training data to be used to train the data mining models.

39. The system of claim 38, wherein the database comprises test and evaluation data to be used to test and evaluate the data mining models.

40. The system of claim 39, wherein the database comprises scoring data to be used to score the data mining models.

41. The system of claim 40, wherein each data mining project object maintains a name space within which data mining objects are named.

42. The system of claim 41, wherein a data mining project object may be shared among users.

43. The system of claim 42, wherein the data mining table objects are included in the data mining object repository.

44. The system of claim 43, wherein each data mining table includes a set of columns of data mining data and associated metadata.

45. The system of claim 44, wherein each data mining transformation object performs data transformations on a data mining table, a data column in a data mining table, a data row in a data mining table, or a value in a data row or a data column in a data mining table.

46. The system of claim 45, wherein each data mining transformation object comprises metadata.

47. The system of claim 46, wherein each data mining settings object comprises metadata.

48. The system of claim 47, wherein each data mining model comprises metadata.

49. The system of claim 48, further comprising a plurality of schema view objects, each schema view object providing access to a data table in the data mining object repository.

* * * * *